United States Patent

Baxter et al.

[15] 3,670,103

[45] June 13, 1972

[54] GRAPHICAL INPUT TABLET

[72] Inventors: Larry K. Baxter; Shintaro Asano, both of Boston, Mass.

[73] Assignee: Shintron Company, Inc., Cambridge, Mass.

[22] Filed: April 28, 1971

[21] Appl. No.: 138,203

Related U.S. Application Data

[62] Division of Ser. No. 722,335, April 18, 1968, Pat. No. 3,591,718.

[52] U.S. Cl. .......... 178/19

[51] Int. Cl. .......... G08c 21/00

[58] Field of Search .......... 178/18, 19, 20; 331/35

[56] References Cited

UNITED STATES PATENTS 3,591,718 7/1971 Baxter et al .......... 178/19

3,530,241 9/1970 Ellis .......... 178/19

*Primary Examiner*—Kathleen H. Claffy

*Assistant Examiner*—Horst F. Brauner

*Attorney*—Wolf, Greenfield & Sacks

[57] ABSTRACT

An a-c potential field is established on an electrographic tablet. A stylus that may be used to write upon the tablet comprises a capacitive pickup to provide a potential representative of the stylus position. The potential field is alternately switched at a rapid rate between vertical equipotentials and horizontal equipotentials in synchronism with output analog switches coupled to the stylus to provide an X analog signal output and a Y analog signal output representative of the horizontal and vertical coordinates, respectively, of the stylus tip above the tablet.

1 Claim, 11 Drawing Figures

INVENTOR.
LARRY K. BAXTER
BY SHINTARO ASANO
Wolf, Greenfield & Sacks
ATTORNEYS

INVENTOR.
LARRY K. BAXTER
BY SHINTARO ASANO
Wolf, Greenfield & Sacks
ATTORNEYS

INVENTOR.
LARRY K. BAXTER
BY SHINTARO ASANO
Wolf, Greenfield & Sacks
ATTORNEYS

INVENTOR.
LARRY K. BAXTER
BY SHINTARO ASANO
Wolf, Greenfield & Sacks
ATTORNEYS

INVENTORS
LARRY K. BAXTER
SHINTARO ASANO
BY Wolf, Greenfield & Sacks
ATTORNEYS

GRAPHICAL INPUT TABLET

This is a division of application Ser. No. 722,335, filed Apr. 18, 1968, now patent No. 3,591,718.

BACKGROUND OF THE INVENTION

The present invention relates in general to electrography and more particularly concerns a novel graphics tablet generally of the sheet conductor type to provide information about the stylus position on the tablet with improved accuracy and resolution while greatly simplifying the electronic circuitry for producing the required potential distribution and reducing the size of the system.

A number of techniques are available for communicating with a computer through a stylus. An early approach involved the use of a "light pencil." If action were to be taken on a particular target displayed on a display tube, the light pencil was placed on that particular target. The light pencil, having a photoelectric transducer, produced a pulse when the selected target area was struck by the scanning electron beam to signal the target location to associated computing apparatus.

Other forms of communicating with a computer by a stylus included conducive tablets having d-c fields established on the conductive surface. A conducting stylus contacting the surface would bear a potential characteristic of the pencil position. Such a system, while satisfactory for a number of applications, required a metal, non-writing stylus and had less accuracy and resolution than desired.

Accordingly, it is an important object of this invention to provide an electrographic tablet characterized by relatively high accuracy and resolution.

It is another object of the invention to achieve the preceding object with simplified electronic circuitry in a system that is relatively compact and lightweight.

BRIEF SUMMARY OF THE INVENTION

According to the invention, there is a conductive sheet of high resistivity framed by contacting material of much lower resistivity. Means are provided for establishing first and second orthogonal fields in the conductive sheet during mutually exclusive time intervals. Stylus means capacitively couple the signal on a point of the sheet to first and second output terminals during mutually exclusive time intervals corresponding to the existence of the first and second electric fields, respectively, so that the signals on the first and second output terminals are representative of orthogonal coordinates of the stylus position on the conductive sheet.

Other features, objects and advantages of the invention will become apparent from the following specification when read in connection with the accompanying drawing in which:

DETAILED DESCRIPTION OF PREFERRED EMBODIMENTS

Figures 1, 2, 3:
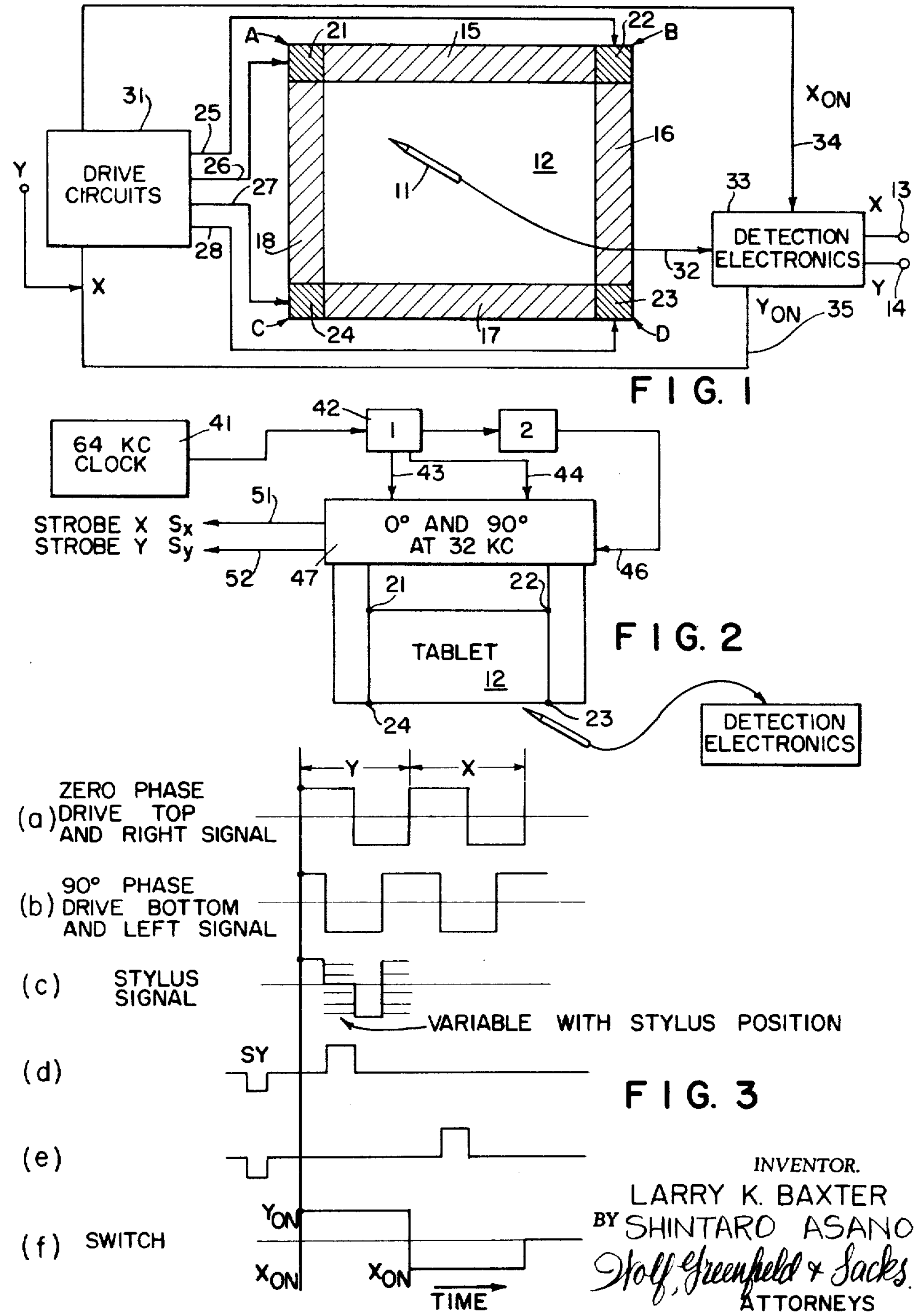
FIG. 1 is a combined pictorial-block diagram illustrating the logical arrangement of a system according to the invention.
FIG. 2 is a block diagram illustrating the logical arrangement of an exemplary drive system.
FIG. 3 is a graphical representation of certain signal waveforms plotted to a common time scale helpful in understanding operation of the system.

With reference now to the drawing and more particularly FIG. 1 thereof, there is shown a combined pictorial-block diagram generally illustrating the logical arrangement of a system according to the invention. When stylus 11 writes on tablet 12, output signals are provided on output terminals 13 and 14 representative of the X (or horizontal) and Y (or vertical) coordinates of the tip of stylus 11 on the conductive sheet 12.

Conducting sheet 12 is typically made of material such as vapor-deposited chromel having a resistance of 10 kilohms per square and is surrounded by four lower resistivity strips 15, 16, 17 and 18 of much lower resistivity, typically 10 ohms per square.

Four corner conducting terminals 21, 22, 23 and 24 receive energy from drive circuits 31 over output lines 26, 25,28 and 27, respectively.

A coaxial cable 32 couples stylus 11 to the detection electronics 33.

The tablet structure is such that when terminals 21 and 22 are at one potential, and a different potential is applied to terminals 23 and 24, the equipotential lines in writing area 12 are essentially parallel and horizontal. Similarly, if terminals 21 and 24 are at one potential, and a different potential is applied to terminals 22 and 23, the equipotential lines in writing area 12 are essentially parallel and vertical. Drive circuit 31 functions to establish first a set of horizontal equipotential lines and then a set of vertical equipotential lines during alternating mutually exclusive time intervals by applying appropriate potentials to terminals 21, 22, 23 and 24. These time intervals are sufficiently short so that stylus 11 may capacitively pick up an a-c signal from the tablet 12 of amplitude that is alternately representative of X and Y coordinates of the tip of stylus 11 over the writing area. When the equipotential lines are essentially vertical, drive circuits 31 provides a conditioning potential on line 34 that conditions detection electronics 33 to provide a signal on terminal 13 having an amplitude representative of the X coordinate of the tip of stylus 11. When the equipotential lines are essentially horizontal, drive circuits 31 provide a signal on line 35 that conditions the detective electronics 33 to provide a signal on output line 14 representative of the Y coordinate of the tip of stylus 11.

Alternately, drive circuit 31 may apply a potential between strips 15 and 17 that is 90° out of phase from the signal applied between strips 16 and 18 and apply corresponding phase displaced signals to lines 34 and 35 to effect peak detection in detection electronics 33 to peak detect at phase intervals of substantially 90° of the drive signal.

Referring to FIG. 2, there is shown a block diagram illustrating the logical arrangement for driving the invention with simplified electronics and a relatively high sample rate for the analog output electronics. A 64 kHz signal is applied to flip-flop 42 that provides a 32 kHz signal of phase 0° on output line 43 and of phase 90° on output line 44. Flip-flop 42 energizes another divider flip-flop signal for conditioning the X Y switch on line 46 that is applied to driver stages 47 to appropriately energize electrodes 21, 22, 23, and 24 while providing a strobe signal $S_x$ on line 51 and a strobe signal $S_y$ on line 52 for sampling the stylus output during appropriate time intervals.

Referring to FIG. 3, there is shown a graphical representation of appropriate signal waveforms plotted to a common time scale helpful in understanding the relationship of the different waveforms. In the Y time interval the 0 phase signal shown in FIG. 3(*a*) provided on line 43 is used to drive top strip 15 while the 90° phase signal shown in FIG. 3(*b*) provided on line 44 is used to drive bottom strip 17 so that a difference in potential between top strip 15 and bottom strip 17 exists only during the second and fourth quarter of the Y cycle. It is in this interval that the stylus signal amplitude is meaningful as to stylus tip position and caused to be sampled by the occurrence of the $S_y$ strobe signal shown in FIG. 3 (*d*).

Similarly when the X Y switch signal shown in FIG. 3(*f*) provided on line 46 causes strips 16 and 18 to be driven, the zero phase signal shown in FIG. 3(*a*) drives right strip 16 while the 90° phase signal shown in FIG. 3(*b*) drives left strip 18 so that a meaningful potential occurs during the second quarter of the X cycle when the strobe signal $S_x$ is provided as shown in FIG. 3(*e*). Details of specific logical blocks for providing these waveforms are well known to those skilled in the art; therefore, in order to avoid obscuring the principles of the invention, these details are not shown.

Figure 4:
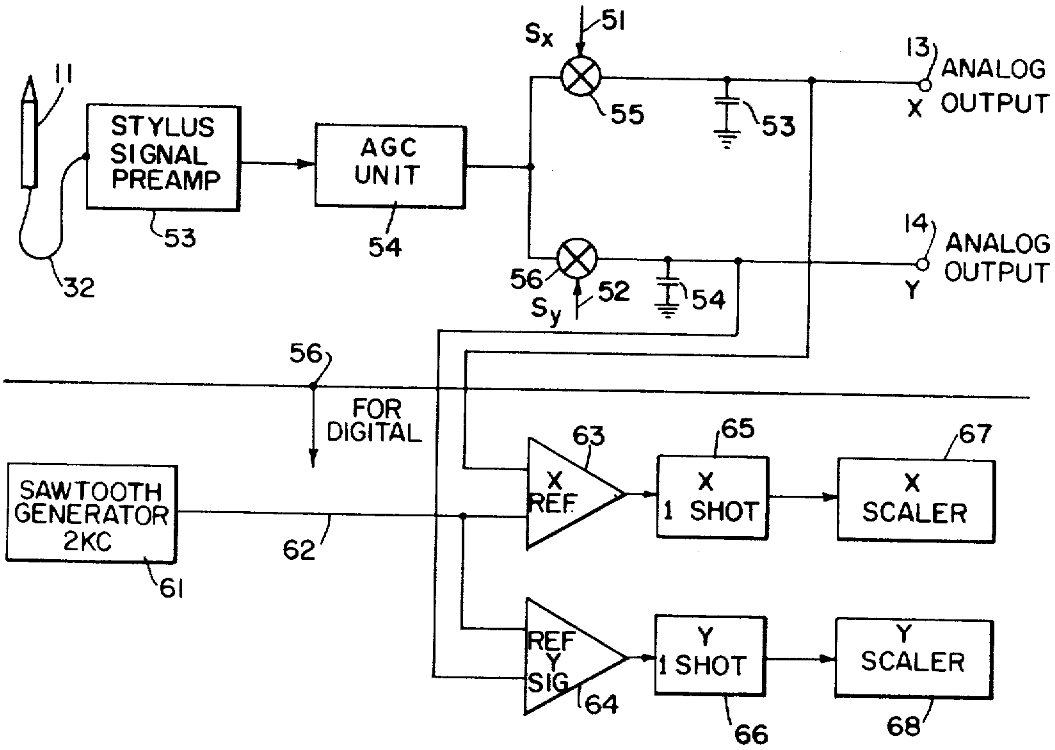
FIG. 4 is a block diagram illustrating a preferred form of electronic detection system.

Referring to FIG. 4, there is shown a block diagram illustrating the logical arrangement of a detecting system according to the invention. Stylus 11 is coupled by coaxial cable 32 to stylus signal preamp 53. The preamplified signal is stabilized as to gain on peak in AGC unit 54. The output of AGC unit 54 branches into an X switch through analog switch 55 and a Y switch through analog switch 56. These switches close only during the intervals when the $S_x$ and $S_y$ gating signals are present on lines 51 and 52, respectively, to appropriately charge holding capacitors 53 and 54, respectively, with analog potentials on terminals 13 and 14, respectively, representative of the contemporaneous position of stylus 11 on tablet 12.

If desired, the potential on terminals 13 and 14 may be digitized. For example the output of the second flip-flop may be divided down to provide a 2 kHz signal that energizes sawtooth generator 61 to provide a sawtooth signal embracing the amplitude range over which the X and Y analog signals may vary. This sawtooth signal is delivered over line 62 to the reference signal inputs of the X comparator 63 and the Y comparator 64. The signal inputs of comparators 63 and 64 are respectively energized by the analog signals on X output terminal 13 and Y output terminal 14, respectively, to trigger the X one-shot multivibrator 55 and Y one-shot multivibrator 66, respectively, when equal levels are sensed. X and Y scaling is done with one clock, which runs continuously, and is strobed into X holding register when 65 turns on and Y holding register when 66 turns on. When thus enabled, the X scaler 67 and Y scaler 68, respectively, count the clock pulses provided by clock pulse source 41 to thereby encode the levels in 1,024 levels. Of course, other analog-to-digital techniques may be employed within the principles of the invention. Since such scalers are well known in the art, details of the specific components are not described so as to avoid obscuring the principles of this invention.

Figure 5:
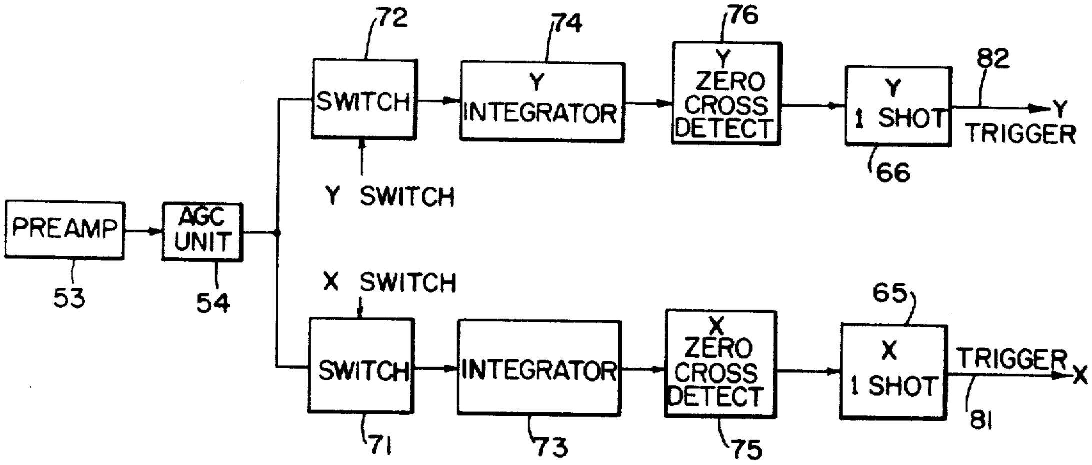
FIG. 5 is a block diagram illustrating the logical arrangement of a preferred system for triggering one-shot multivibrators.

FIG. Referring to FIG. 5, there is shown a block diagram illustrating the logical arrangement of a preferred system for triggering the one-shot multivibrators 65 and 66.

The output of preamp signal 53 is again applied to AGC unit 54 that controls the gain on peak so that the ratio of signal amplitude during the second quarter to signal amplitude outside the second quarter of a cycle is significant. X-switch 71 and Y-switch 72 are closed only during the X and Y intervals, respectively, to then provide generally rectangular waveforms to X integrator 73 and Y integrator 74, respectively. These integrators provide generally sawtooth waveforms having zero crossings representative of the corresponding X and Y coordinates of the stylus tip. The appropriate zero crossing is sensed by X zero crossing detector 75 and Y zero crossing detector 76 to trigger X one-shot multivibrator 65 and Y one-shot multivibrator 66, respectively.

Figure 6:
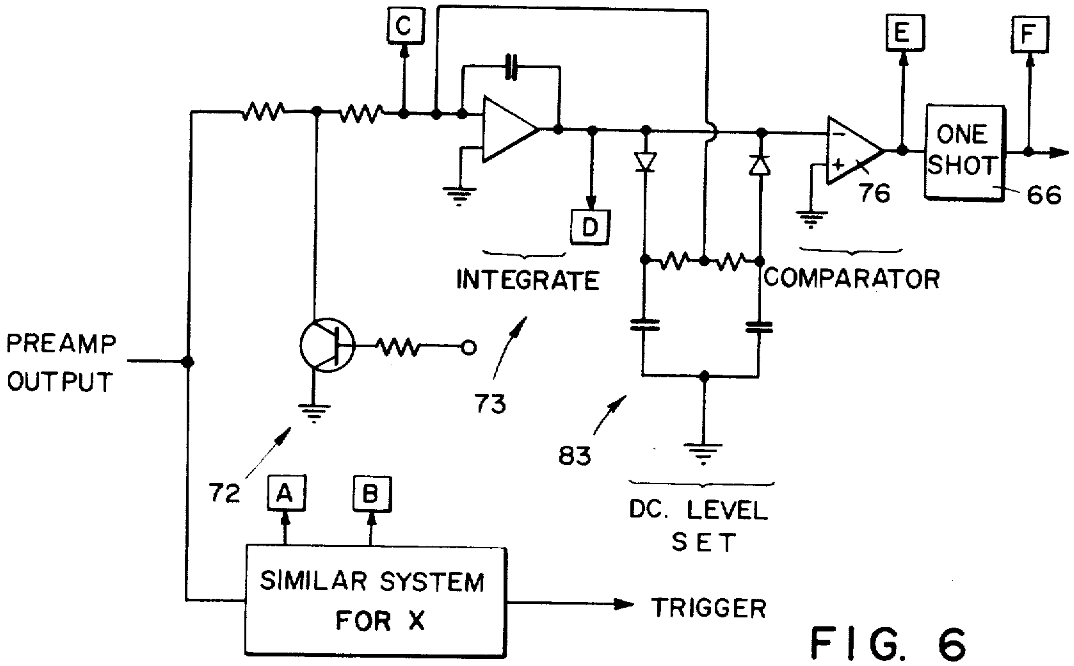
FIG. 6 is a combined block-schematic circuit diagram of the Y channel, the similar X channel being depicted more generally.

Referring to FIG. 6, there is shown a combined block-schematic circuit diagram of the Y channel, the X channel being similar. The Y switch 72 comprises a double-emitter transistor. The integrator 73 comprises an operational amplifier having a d-c level set circuit 83 on the output line feeding back a d-c level to the input. Zero crossing detector 76 comprises a comparator that provides a pulse triggering one-shot multivibrator 66 when the negative-going crossover occurs. The pulse thus provided by one-shot multivibrator 66 is positioned in time representative of the Y coordinate of the tip of stylus 11.

There is a similar system for the X channel generally represented by the block 84 and point A and B in the X channel correspond to points C and D, respectively, in the Y channel.

Figure 7:
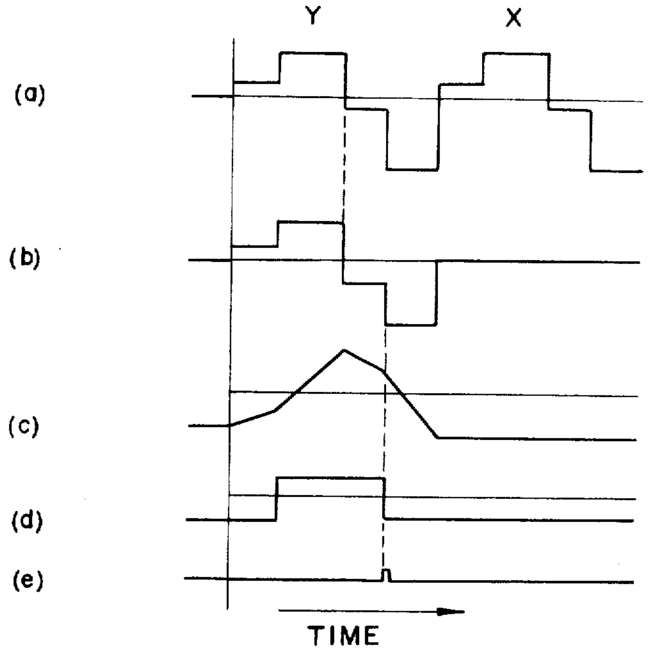
FIG. 7 shows a graphical representation of certain signal waveforms at various points in the system of FIG. 6 helpful in understanding its operation.

Referring to FIG. 7, there is shown a graphical representation of certain signal waveforms at various points helpful in understanding the detection system of FIG. 6. Since the waveforms on points A and B of the X channel are similar to the waveforms on points C and D, respectively, of the Y channel, except that they occur in the X interval instead of the Y interval, the waveforms on points A and B in the X channel are not shown. FIG. 7 (*a*) shows a typical input signal waveform of the same character as that shown in FIG. 3(c). FIG. 79*b*) shows that the waveform of FIG. 7(*a*) is passed by switch 72 only during the Y interval to point C. Similarly the waveform of FIG. 7(*a*) would be transferred to point A only during the X interval.

FIG. 7 (*c*) shows the integral of the waveform of FIG. 7(*b*). Note that this waveform has a positive going and negative going zero crossing. FIG. 7(*d*) shows the two-state waveform at the output of the comparator at point E that is negative and positive when the waveform of FIG. 8 (*c*) is negative and positive, respectively, to produce a sharp transition at the zero crossings. FIG. 7 (*e*) shows the output of one-shot multivibrator 66 that is triggered in response to the negative-going transition of the waveform of FIG. 7(*d*) substantially coincident with the negative-going zero crossing of the waveform of FIG. 7(*d*). Thus the position of the pulse provided by one-shot multivibrator 65 is representative of the X coordinate. This pulse may be used to strobe a scaler into a holding register to provide a digital indication of pulse position, or it may be used to sample a ramp waveform whose value may then be held to provide an analog representation of the coordinate.

Figure 8:
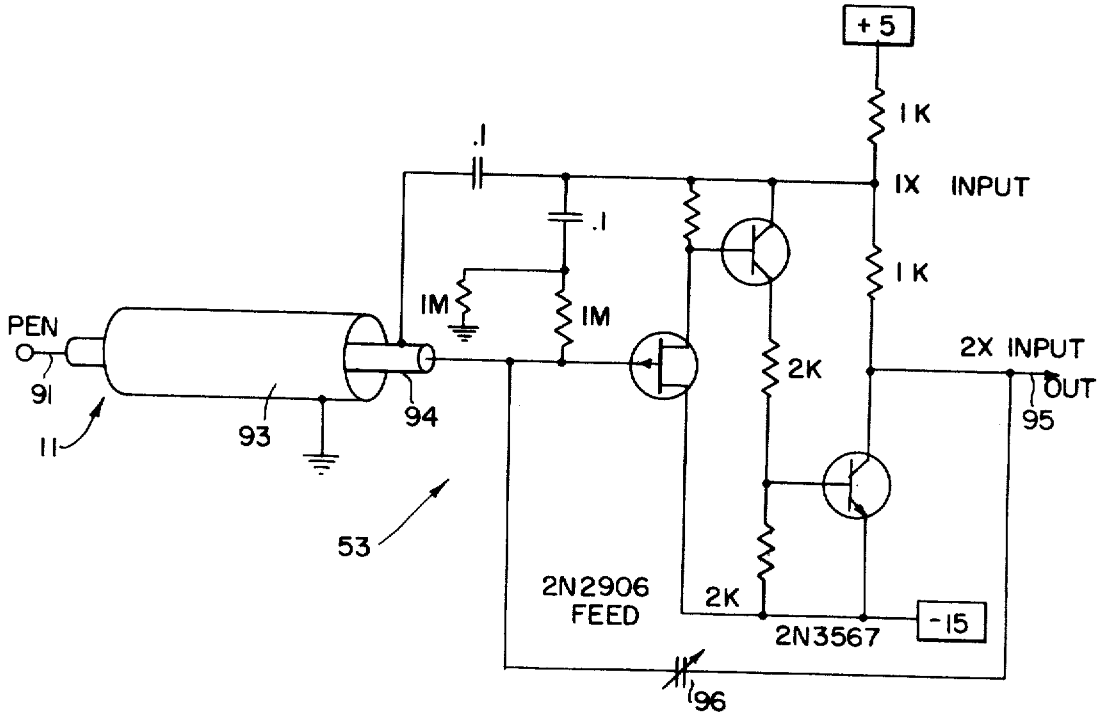
FIG. 8 shows a preferred form of stylus and preamplifier.

Referring to FIG. 8, there is shown a preferred form of stylus 11 and preamplifier 53. Stylus 11 preferably comprises a double-shielded coaxial line with the inner conductor 91 terminating in the tip, the outer conductor 93 grounded at the output end and the intermediate conductor 94 being connected in a bootstrapping circuit as shown. There is also capacitive cancelling feedback from output line 95 through adjustable capacitor 96 to the output end of inner conductor 91 so that the effective capacity presented to the stylus tip is very nearly zero. Since those skilled in the art may readily practice the invention by building the preamplifier of FIG. 8 with the specific parameter values shown in the drawings, detailed discussion of this circuitry is unnecessary for an understanding of the invention. Other circuitry and other styli may be employed without departing from the principles of the invention.

Figure 9:
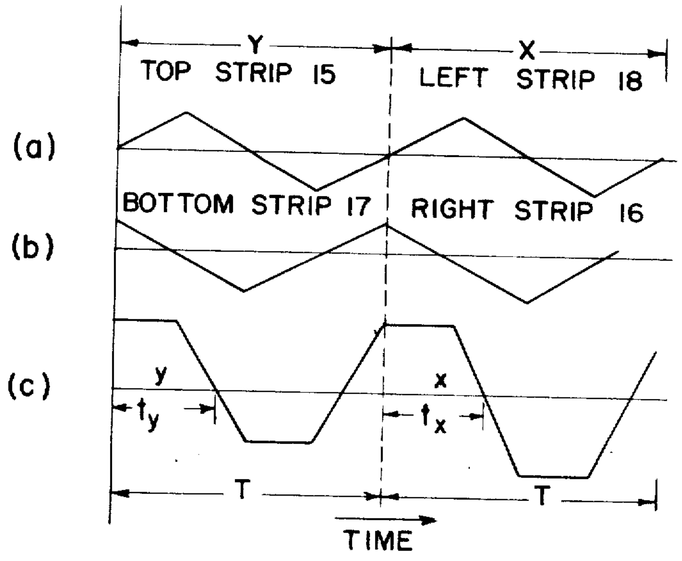
FIG. 9 shows a graphical representation of signal waveforms plotted to a common time scale helpful in understanding a technique for deriving a signal representative of the horizontal coordinates of the stylus tip.

Referring to FIG. 9, there is shown a graphical representation of signal waveforms plotted to a common time scale helpful in understanding still another technique for deriving a signal representative of the horizontal coordinates of the tip of the stylus 11. According to this method, the top strip 15 and bottom strip 17 are energized with triangular waveforms of the same period but displaced in phase by 90° during the Y interval as shown in FIGS. 9(a) and 9(b). Then these phase-quadrature triangular waveforms are applied to respective ones of left strip 18 and right strip 16 during the X interval. FIG. 9(*c*) shows the resultant signal provided by stylus 11 when the X and Y time intervals each correspond to the duration of the period T of the sawtooth waveform, a typical condition when conducting surface 12 is square. Defining the time from the start of a Y and an X interval to the next zero crossing as $t_y$ and $t_x$, respectively, it follows that $t_y/T$ and $t_x/T$ are proportional to the *x* and *y* coordinates, respectively, of the tip of stylus 11.

By generating a narrow strobe pulse at the occurrence of such zero crossing, typically in a manner similar to that described above, and by generating the triangular waves by integrating the square wave provided by the low frequency stages of a scaler, the digital number in the scaler may be strobed by the zero crossing strobe pulse into a holding register to provide digital output signals. By synchronizing a ramp waveform with the low frequency scaler signal, the level of the ramp waveform may be strobed by the zero crossing strobe pulse into a holding capacitor to provide analog output signals.

Figure 10:
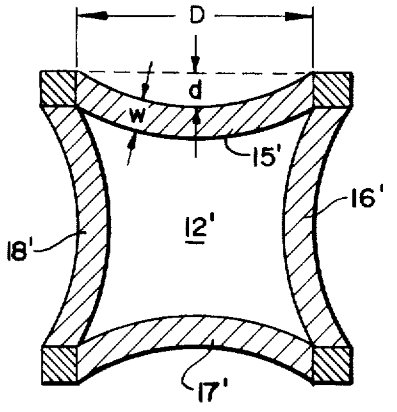
FIG. 10 shows a preferred tablet arrangement that is especially useful with practical resistive materials having less than ideal resistance characteristics.

Referring to FIG. 10, there is shown a preferred tablet arrangement that is especially useful when using practical resistive materials having less than ideal resistance characteristics. The tablet 12' is of generally pin cushion configuration bounded by parabolic low resistivity strips 15', 16', 17' and 18' of width *w* and peak deflection from a chord joining their ends of *d*. If the resistance of each strip 15', 16', 17' and 18' is R and the length of a chord spanning each strip D, the relationship of the quantities is given by $d/D = R/\rho$ . A typical value for the resistivity $\rho$ is 2,000 ohms per square while that for R of the parabolic strips is 10 ohms per square.

Figure 11:
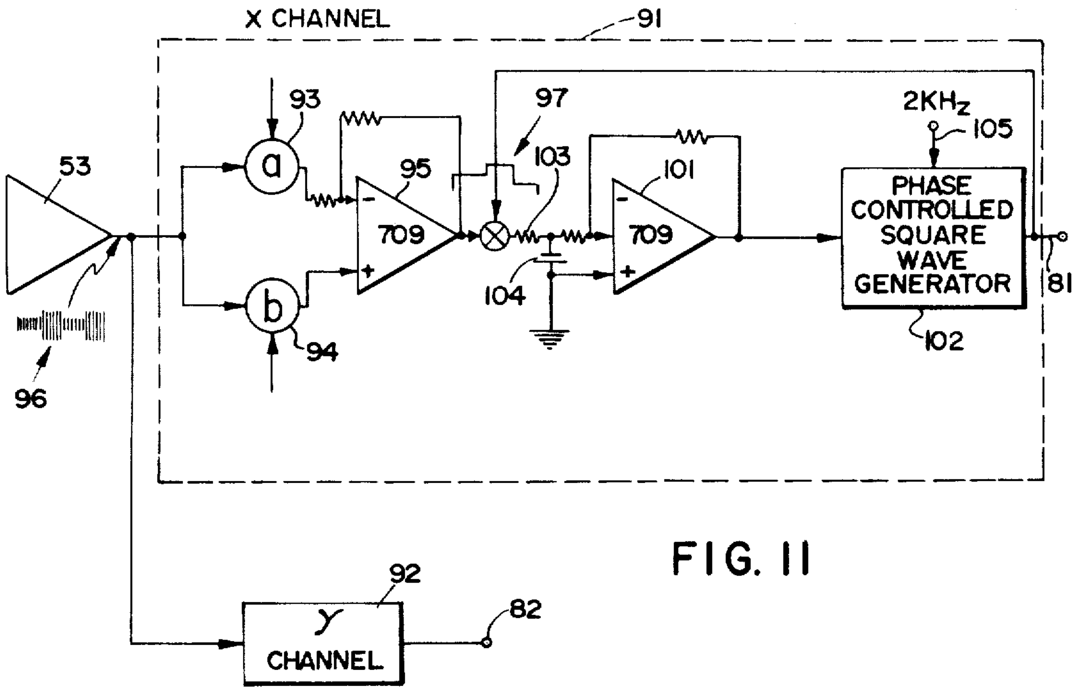
FIG. 11 shows a block diagram illustrating the logical arrangement of an advantageous form of detection electronics incorporating a phase locked loop.

Referring to FIG. 11, there is shown a block diagram illustrating the logical arrangement of an advantageous form of detection electronics incorporating a phase locked loop. The X channel 91 and Y channel 92 are similar so only the X channel 91 is illustrated in detail. The output of preamp 53 is selectively transmitted through an *a* switch 93 and a b switch 94 during the X interval to the + and − inputs, respectively, of differential amplifier 95, typically a 709 integrated circuit as indicated. Differential amplifier 95 typically amplifies and full-wave rectifies the waveform 96 from preamplifier 53 during the X interval to provide the output signal waveform 97 carrying phase information. The gating signals applied to switches 93 and 94 are typically 100 kc square waves with the *b* signal being the complement of the *a* signal. The output of differential amplifier 95 is applied to the − input of differential amplifier 101 in the phase locked loop through means including multiplier 98. Multiplier 98 also receives a feedback signal from phase controlled square wave generator 102 to provide an output that functions to servo the phase controlled square wave provided by phase controlled square wave generator 102 at a phase angle 90° ahead of the phase angle carried by output waveform 97.

To this end the output of multiplier 98 is coupled by an integrating circuit comprising resistor 103 and capacitor 104 to the input of operational amplifier 101 to provide a control voltage that adjusts the phase of phase controlled square wave generator 102 so that its phase is displaced 90° from that carried by waveform 97. The time constant $\tau$ is typically chosen to be long compared to the period of the phase controlled square wave provided by generator 102 and short enough to follow changes in phase representative of movements of writing pen 11. Phase controlled square wave generator 102 typically is triggered from the 2 kHz clock pulse source on clock pulse input 105 so that the frequency of the phase controlled square wave is in synchronism with system clock rate while its phase is representative of the position of pen 11 above tablet 12. The output of phase controlled square wave generator 102 on line 81 may then function essentially in the manner of the trigger on the corresponding output line in FIG. 5 described above.

Phase controlled square wave generator 102 may typically be fundamentally a monostable multivibrator that is triggered into the astable state in response to each pulse applied to clock pulse input 105 while the instant of return to the stable state is determined by the control voltage provided by the integrating circuit. The relationship between control voltage and instant of return to the stable state need not be linear because the establishment of the phase lock loop insures that the strobe pulses on output line 81 precisely track the phase carried by signal 97. In a similar manner the pulses on line 82 occur at instants representative of the Y phase information carried by the input signal applied to the input of channel 92.

There has been described a novel electrographic system characterized by high accuracy and resolution while utilizing relatively simple circuitry capable of providing an accurate indication reliably. It is evident that those skilled in the art may now make numerous uses and modifications of and departures from the specific embodiments described herein without departing from the inventive concept. Consequently, the invention is to be construed as embracing each and every novel combination of features present in or possessed by the apparatus and techniques herein disclosed.

What is claimed is:

1. In an electrographic apparatus having a conductive tablet, means for selectively establishing first and second orthogonal electric fields in said conductive sheet during mutually exclusive time intervals, and probe means for coupling a signal on a point of said tablet to first and second terminals, phase controlled detection electronics comprising,
   - a difference amplifier means having a pair of input terminals coupled to said probe means,
   - a multiplier having one input coupled from said difference amplifier,
   - an output amplifier coupled from the output of said multiplier,
   - and a phase controlled square wave generator coupled from said output amplifier and having an output that couples to another input of said multiplier.

* * * * *